(12) United States Patent
Hoche et al.

(10) Patent No.: US 8,733,318 B2
(45) Date of Patent: May 27, 2014

(54) INTERNAL COMBUSTION ENGINE

(75) Inventors: Florian Hoche, Marbach (DE); Michael Raffenberg, Fellbach (DE); Andreas Hägele, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 728 days.

(21) Appl. No.: 12/731,338

(22) Filed: Mar. 25, 2010

(65) Prior Publication Data

US 2010/0242904 A1 Sep. 30, 2010

(30) Foreign Application Priority Data

Mar. 26, 2009 (DE) .......................... 10 2009 015 018

(51) Int. Cl.
*F02D 9/08* (2006.01)

(52) U.S. Cl.
USPC ....................................... 123/337; 123/184.21

(58) Field of Classification Search
USPC ........ 123/473 A, 73 R, 73 PP, 336, 337, 432,
123/184.21, 184.22, 184.24, 184.25,
123/184.48, 184.49, 184.51, 184.55;
261/23.1, 23.3, 38, 44.6
See application file for complete search history.

(56) References Cited

U.S. PATENT DOCUMENTS

| | | | |
|---|---|---|---|
| 4,697,569 A * | 10/1987 | Hertweck et al. ........ | 123/568.17 |
| 5,613,468 A * | 3/1997 | Ibara et al. ................ | 123/73 A |
| 6,739,313 B2 * | 5/2004 | Watanabe ................ | 123/339.23 |
| 6,889,637 B2 | 5/2005 | Rosskamp | |
| 7,090,204 B2 * | 8/2006 | Zwimpfer et al. ............. | 261/46 |
| 7,357,377 B2 * | 4/2008 | Glover et al. ................... | 261/46 |
| 7,513,225 B2 | 4/2009 | Geyer | |
| 7,694,943 B2 * | 4/2010 | Mason et al. ................. | 261/23.3 |
| 7,819,391 B2 * | 10/2010 | Glover .......................... | 261/23.2 |
| 2003/0111063 A1 * | 6/2003 | Iida ................................ | 123/527 |
| 2004/0051186 A1 * | 3/2004 | Gerhardy et al. .............. | 261/43 |
| 2005/0120985 A1 * | 6/2005 | Rosskamp ................ | 123/73 PP |
| 2005/0188952 A1 * | 9/2005 | Prager ........................... | 123/337 |
| 2006/0163755 A1 * | 7/2006 | Prager ............................. | 261/46 |
| 2007/0132115 A1 * | 6/2007 | Glover ............................ | 261/40 |
| 2007/0257379 A1 * | 11/2007 | Mason et al. ................. | 261/44.6 |
| 2009/0013963 A1 * | 1/2009 | Eberhardt et al. ............. | 123/337 |

FOREIGN PATENT DOCUMENTS

JP S 59-196558 12/1984

* cited by examiner

*Primary Examiner* — John Kwon
*Assistant Examiner* — Johnny Hoang
(74) *Attorney, Agent, or Firm* — Jennifer S. Stachniak; Robert W. Becker

(57) ABSTRACT

An internal combustion engine having an intake channel that is divided by a partition into an air duct and a mixture duct. The partition has a connecting opening that at least at full throttle of the internal combustion engine is substantially closed. A main fuel opening opens out into the mixture duct. At least one further fuel opening is provided that opens out into the mixture duct at a first distance relative to the wall of the intake channel and at a second distance relative to the partition.

21 Claims, 2 Drawing Sheets

INTERNAL COMBUSTION ENGINE

The instant application should be granted the priority date of Mar. 26, 2009, the filing date of the corresponding German patent application 10 2009 015 018.8.

BACKGROUND OF THE INVENTION

The present invention relates to an internal combustion engine.

U.S. Pat. No. 6,889,637 B2 discloses a two-cycle engine, the intake channel of which is divided into an air duct and a mixture duct. A main fuel opening, as well as auxiliary fuel openings that are formed as bores in the channel wall of a carburetor, open out into the intake channel. To achieve a good running behavior, it is desirable with such internal combustion engines also be able to supply fuel via the air duct during idling and in low partial throttle.

It has been shown that with the arrangement of the fuel openings shown in the aforementioned U.S. Pat. No. 6,889, 637 B2, hardly any fuel enters the air duct even when the connecting opening between the air duct and the mixture duct Is open during operation. As a result, an unfavorable running behavior can result.

It is therefore an object of the present invention to provide an internal combustion engine of the aforementioned general type that has a good running behavior.

BRIEF DESCRIPTION OF THE DRAWINGS

This object, and other objects and advantages of the present application, will appear more clearly from the following specification in conjunction with the accompanying schematic drawings, in which.

SUMMARY OF THE INVENTION

Figure 1:
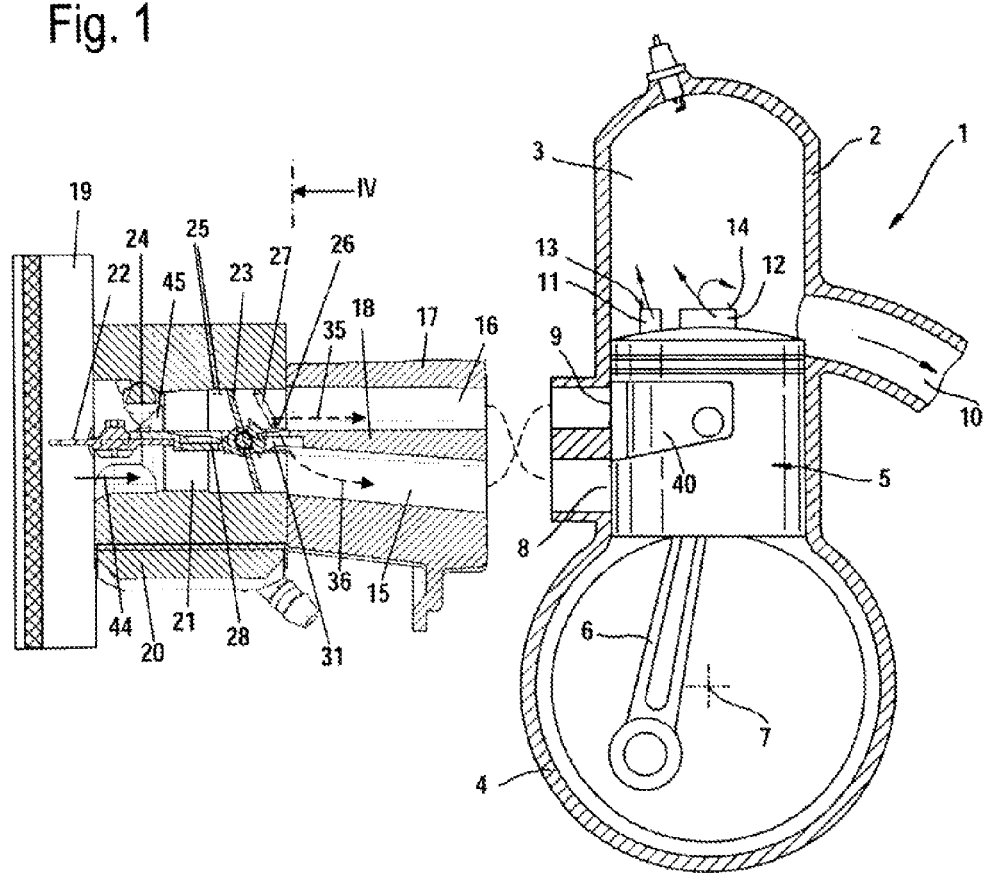
FIG. 1 is a cross-sectional view showing an internal combustion engine in the idling position.

The internal combustion engine of the present application comprises a structure having an intake channel; a partition disposed in the intake channel and dividing it into an air duct and a mixture dud, wherein the partition is provided with a connection opening; between the air duct 10 and the mixture duct, that at least in a full throttle condition of the internal combustion engine is adapted to be substantially closed; a main fuel opening disposed in the structure and opening out into the mixture duct; and at least one further fuel opening that is spaced from a wall of the intake channel by a first distance, and that opens out into the mixture duct at a second distance relative to the partition.

It has been shown that with an internal combustion engine having a divided intake channel, in particular during idling and during low partial throttle, turbulence forms in the region of the throttle element, which leads to a pressing of the fuel exiting from the fuel openings against the wall of the intake channels. There, the fuel can be deposited as a wall film, and is thus transported to the crankcase of the internal combustion engine. As a result, no fuel is transferred into the air duct through the connecting opening. Due to the fact that the further fuel opening is, pursuant to the present application, now spaced from the wall of the channel, the fuel opening extends into the flow in the intake channel. The fuel that is exiting is carried along by the air stream and can thus also pass into the air duct through the connecting opening. The spacing of the fuel opening from the wall of the channel prevents the fuel coming from the fuel opening from being pressed as a wall film on the wall of the channel. A wall film on the partition is prevented by the spacing of the fuel opening from the partition. As a consequence, an improved running behavior of the internal combustion engine can be achieved in a straightforward manner. At least in full throttle, the connecting opening in the partition is substantially closed. In this way, a functional separation of air duct and mixture duct are to be achieved. A slight residual opening, for example a gap at the edge of the connecting opening, can remain.

The further fuel opening is advantageously formed at a fuel tube that extends into the intake channel, in particular at the free end of the fuel tube. This results in a straightforward configuration. The fuel tube advantageously has a length, extending into the intake channel, that is at least 10% of the diameter of the intake channel. An advantageous length of the fuel tube is approximately 25% to approximately 60% of the diameter of the intake channel. A length of the fuel tube of greater than 50% of the diameter of the intake channel can, where the intake channel is centrally divided, be achieved by an inclined positioning of the fuel tube. As a result of the indicated lengths of the fuel tube, the further fuel opening opens out into a region of the intake channel in which favorable flow conditions exist. The fuel is consequently carried along from the fuel opening by the drawn-in air into the air duct and the mixture duct. The formation of a wall film can be avoided or at least significantly reduced.

The further fuel opening expediently opens out at a slight distance relative to the plane of the partition. The spacing of the fuel opening relative to the plane of the partition is advantageously less than approximately 30%, and in particular less than approximately 15%, of the diameter of the intake channel. As a result, the fuel opening is disposed close to the air duct, thus ensuring that when the connecting opening is open, fuel can also pass into the air duct.

The distance of the fuel opening from the wall of the intake channel is advantageously at least approximately 5%, and in particular more than approximately 10%, of the diameter of the intake channel. In this connection, the distance is the least distance of the fuel opening to one wall of the intake channel, and can, for example, also be measured transverse to the longitudinal direction of the fuel tube. This spacing ensures that the fuel, relative to the longitudinal direction of the fuel tube, cannot be laterally deposited on the wall of the intake channel, and thus cannot form a wall film.

The further fuel opening is advantageously disposed in the intake channel approximately at the level of the connecting opening. This ensures that fuel can pass into the air duct, via the connecting opening, when the connecting opening is opened sufficiently wide. However, the fuel opening can also be provided upstream of the connecting opening. The at least one further fuel opening is in particular an idling fuel opening. In this connection, the idling fuel opening is disposed downstream of the main fuel opening, and where a throttle element is disposed in the intake channel, is expediently disposed downstream of the throttle element when the throttle element is closed. As a result, when the throttle element is closed fuel can pass into the intake channel via the idling fuel opening.

A throttle element is advantageously pivotably mounted in the intake channel, with such throttle element controlling the free flow cross-section in the air duct and in the mixture duct.

As a result, a single throttle element is sufficient for both ducts, and a straightforward construction of an internal combustion engine results. During full throttle, the connecting, opening in the partition is advantageously closed off by the throttle element. At least one partial throttle fuel opening is expediently disposed in the region of the throttle element. The partial throttle fuel opening is advantageously provided downstream of the main fuel opening and upstream of the idling fuel opening. When the throttle element is slightly opened, the partial throttle fuel opening expediently opens out into the intake channel at the level of the throttle element.

A choke element can be disposed in the intake channel upstream of the throttle element. A partition portion is in particular disposed in the intake channel between the choke element and the throttle element. The partition, which separates the air duct from the mixture duct, thus also extends between the throttle element and the choke element. In order to achieve a good sealing of the ducts, and a complete sealing of the air duct and mixture duct at full throttle, the partition portion can be provided with at least one abutment for the choke element and/or the throttle element in the completely opened position.

In order to also achieve a good separation of air duct and mixture duct downstream of the throttle element, the throttle element can be disposed in a carburetor, and an intermediate flange can be disposed downstream of the carburetor, whereby in the completely opened position the throttle element rests against the partition in the intermediate flange. In this connection, the intermediate flange can be a flange made of a largely inherently stable material, or can also be an intake flange made of an elastic material.

The throttle element is expediently a butterfly valve that is pivotably mounted by means of a throttle shaft, and the choke element is a choke valve that is pivotably mounted by means of a choke shaft. The connecting opening is in particular formed between the throttle shaft and the partition in the intermediate flange. Consequently, downstream of the throttle shaft the carburetor no longer has a partition portion. Rather, the separation of the ducts downstream of the butterfly valve, is effected via the partition in the intermediate flange.

Further specific features of the present application will be described in detail subsequently.

DESCRIPTION OF SPECIFIC EMBODIMENTS

Referring now to the drawings in detail, FIG. 1 shows a two-cycle engine 1 as an exemplary embodiment for an internal combustion engine; in the illustrated embodiment, the engine 1 is a one-cylinder engine that operates with scavenging. The two-cycle engine 1 has a cylinder 2, in which a piston 5 is reciprocably mounted. The piston 5 delimits a combustion chamber 3 that is formed in the cylinder 2 and that via a connecting rod 6 drives a crankshaft 7 that is rotatably mounted in a crankcase 4. A mixture inlet 8 is port-controlled by the piston 5. An outlet 10 for exhaust gas leads out of the combustion chamber 3. Furthermore, an air inlet 9 is formed on the cylinder wall; in the region of the upper dead center position of the piston 5, the air inlet 9 is connected via a piston port 40 with transfer windows or ports 13, 14 of the transfer passages 11, 12. In the region of the lower dead center position of the piston 5, the transfer passages 11 and 12 connect the crankcase 4 with the combustion chamber 3. The two-cycle engine 1 has an intake channel 21, which is divided by a partition 18 into an air duct 15 and a mixture duct 16. Predominantly fuel-free air is conveyed via the air duct 15 to the air inlet 9, and fuel/air mixture is conveyed via the mixture duct 16 to the mixture inlet 8. It is also possible in one or more operating states, in particular during idling and partial throttle, to also convey fuel via the air duct 15.

The combustion air is drawn in via an air filter 19, on which a carburetor 20 is disposed. A portion of the intake channel 21 is formed in the carburetor 20. An intermediate flange 17 is disposed downstream of the carburetor 20; the intermediate flange 17 connects the carburetor 20 with the flange of the cylinder 2, at which the air inlet 9 and the mixture inlet 8 are formed. The intermediate flange 17 can be inherently stable, or can be comprised of an elastic material to thus effect an isolation or neutralization of oscillations between the carburetor 20 and the connecting flange of the cylinder 2.

Figure 2:
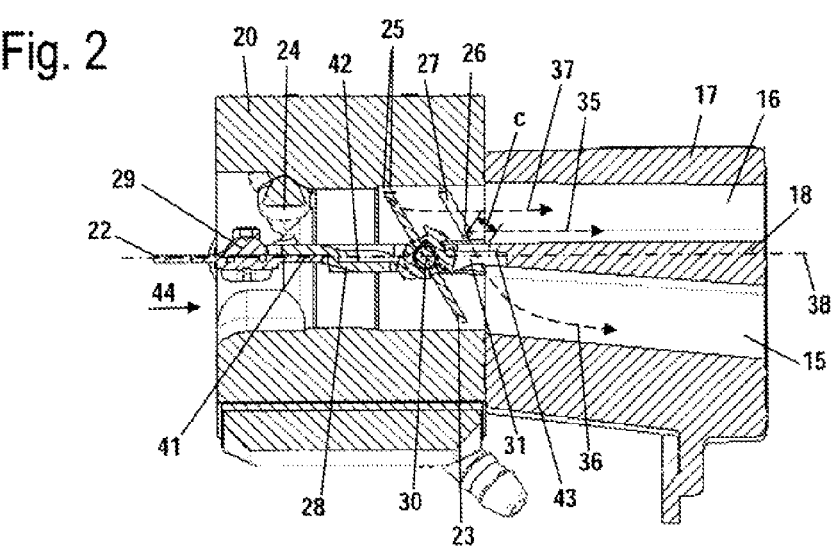
FIG. 2 shows the carburetor and intermediate flange of FIG. 1 in the partial throttle position.

The carburetor 20 has a choke valve 22 that, via a choke valve shaft 29 (FIG. 2), is pivotably mounted in the intake channel 21. Disposed downstream of the choke valve 22 is a throttle or butterfly valve 23, which is pivotably mounted via a shaft 30 (FIG. 2). Provided between the choke valve 22 and the butterfly valve 23 is a partition portion 28, which separates the mixture duct 16 from the air duct 15.

In the direction of flow 44 from the air filter 19 to the cylinder 2, in the intake channel 21 and downstream of the choke valve 22, a venturi 45 is formed, in the region of which a main fuel opening 24 opens out into the mixture duct 16. Downstream of the main fuel opening 24, a plurality of partial throttle fuel openings 25, which are formed as bores in the wall of the intake channel 21, open out into the mixture duct 16. In the idling position shown in FIG. 1, in other words with the butterfly valve 23 to a large extent closed, the partial throttle fuel openings 25 open out into the intake channel 21 upstream of the butterfly valve 23. An idling fuel opening 26 opens out into the mixture duct 16 downstream of the butterfly valve 23. The idling fuel opening 26 is formed on a fuel tube 27 that extends into the intake channel 21 in the region of a connecting opening 31 in the partition 18. The connecting opening 31 is formed between the shaft 30 of the butterfly valve (FIG. 2) and the portion of the partition 18 that is disposed in the intermediate flange 17. By means of the idling fuel opening 26, fuel is conveyed into the mixture duct 16, as indicated by the arrow 35. By means of the connecting opening 31, fuel also passes in the direction of the arrow 36 into the air duct 15. As a result, during idling fuel is conveyed not only via the air duct 15 but also via the mixture duct 16. This results in a good running behavior of the two-cycle engine 1.

In the schematic illustration of FIG. 1, the mixture duct 16 is shown disposed near the top in the carburetor 20 and in the intermediate flange 17, whereas it is disposed near the bottom at the flange of the cylinder 2. The ducts between the intermediate flange and the cylinder 2, or also in the intermediate flange 17, can be guided so as to cross one another. However, it would also be possible to dispose the mixture duct near the bottom in the carburetor, in other words to have the mixture duct extend on that side that faces the crankcase 4, so that the carburetor 20 would be rotated relative to the schematic illustration of FIG. 1.

The idling fuel opening 26 opens out into the intake channel 21 adjacent to the partition 18. As shown in FIG. 2, the idling fuel opening 26 is spaced by a distance c from the partition 18, so that fuel from the idling fuel opening 27 cannot be deposited directly as a wall film on the partition 18. In this region, drawn-in combustion air flows not only into the mixture duct 16 but also into the air duct 15. The fuel is carried along into both ducts 15, 16 by this combustion air.

FIG. 2 shows the butterfly valve 23 in a partially opened position, namely in a partial throttle position. In this position, the edge of the butterfly, valve 23 is disposed in the region of the partial throttle fuel openings 25. As a result, fuel can also pass into the mixture duct 16 in the direction of the arrow 37 via the partial throttle fuel openings 25. By means of the idling fuel opening 26, fuel is conveyed in the direction of the arrows 35 and 36 into the mixture duct 16 and the air duct 15. The connecting opening 31 continues to remain open.

As shown in FIG. 2, the choke valve 22 is in the completely opened position and rests against an abutment 41 on the partition portion 28. In the region of the butterfly valve 23, the partition portion 28 also has an abutment 42 for the butterfly valve 23. Adjacent to the connecting opening 31, an abutment 43 for the butterfly valve 23 is provided on the partition 18 in the intermediate flange 17.

Figure 3:
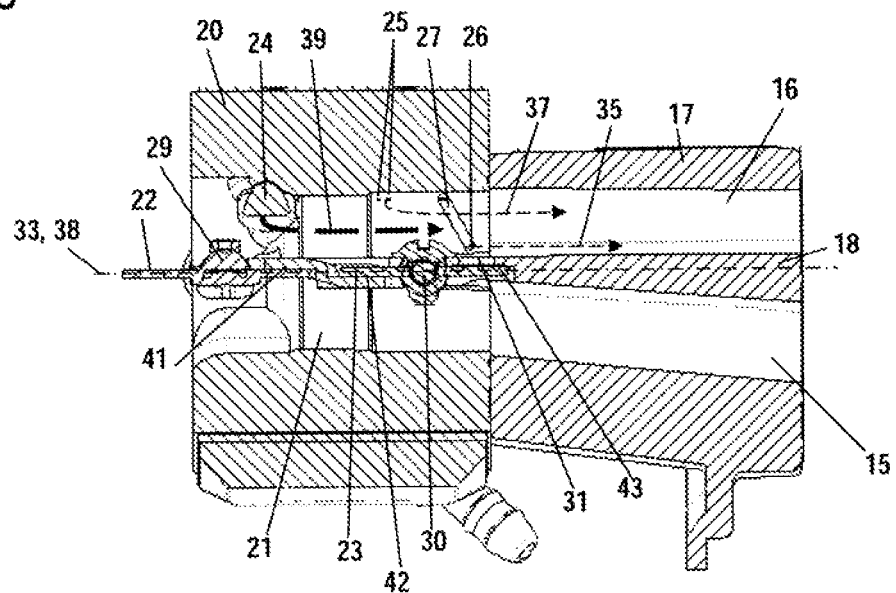
FIG. 3: shows the carburetor and intermediate flange of FIG. 1 in the full throttle position.

As shown in FIG. 3, the choke valve 22, in the completely opened position, rests against the abutment 41, and the butterfly valve 23 rests against the abutments 42 and 43. In this full throttle position, the mixture ducts 16 and the air duct 15 are completely separated from one another. Sealing elements can additionally also be provided on the abutments 41, 42 and 43. As shown in FIG. 3, in the full throttle position an underpressure exists at the main fuel opening 24 due to the opened throttle valve 23. As a result, the main fuel quantity is drawn in in the direction of the arrow 39 into the mixture duct 16 via the main fuel opening 24. By means of the partial throttle fuel openings 25 and the idling fuel opening 26, additional fuel passes into the mixture duct 16 in the direction of the arrows 37 and 35. The connecting opening 31 is closed off by the butterfly valve 23. As a result no appreciable quantity of fuel can pass into the air duct 15. Passage of fuel into the air duct 15 is possible only as a result of sealing leaks at the partition 18.

As shown in FIG. 3, the choke valve 22 and the butterfly valve 23 are in the entirely open position, in other words at full throttle, in the partition plane 33, in other words in a plane that coincides with the partition 18. In this connection, the partition plane 33 contains the longitudinal axis 38 of the intake channel 21 and the pivot axes of the butterfly valve shaft 30 and the choke shaft 29.

Figure 4:
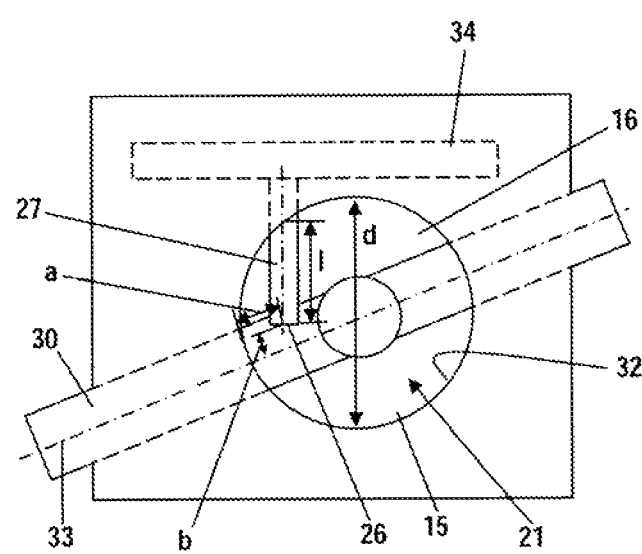
FIG. 4: is a schematic side view onto the downstream end of the carburetor.

In an end view of the carburetor, FIG. 4 shows the position of the idling fuel opening 26, which is connected via the fuel tube 27 with a regulating chamber 34 when the carburetor 20 is embodied as a diaphragm carburetor. The idling fuel opening 26 can also be connected with a differently embodied fuel chamber. The quantity of fuel supplied to the fuel tube 27 can also be controlled by a valve. The fuel tube 27 has a length l, by which it extends into the intake channel 21, that is at least approximately 10% of the diameter d of the intake: channel 21. The length l is advantageously 25% to approximately 60% of the diameter d of the intake channel 21. In the illustrated embodiment, the length l is between approximately 40% and approximately 50% of the diameter d of the intake channel 21. As shown in FIG. 4, the fuel tube 27 is not centrally disposed in the intake channel 21, but rather laterally. The idling fuel opening 26 is spaced by a distance a from the wall 32 of the channel, with this distance a being at least 5%, and in particular more than approximately 10%, of the diameter d of the intake channel 21. In this connection, the distance a is measured to the center of the idling fuel opening 26. The idling fuel opening 26 has a distance b to the partition plane 33, which designates the geometrical center of the partition 18; the distance b is advantageously less than approximately 30% and in particular less than approximately 15%, of the diameter d of the intake channel 21.

Instead of being disposed on a fuel tube, such as the fuel tube 27, the idling fuel opening 26 can also be disposed at a distance relative to the channel wall 32 in some other suitable manner. However, by using a fuel tube 27, a straightforward construction is provided. As shown in FIGS. 1 to 4, the butterfly valve 23 and the choke valve 22 control not only the mixture duct 16 but also the air duct 15.

The specification incorporates by reference the disclosure of German priority document 10 2009 015 018.8 filed Mar. 26, 2009.

The present invention is, of course, in no way restricted to the specific disclosure of the specification and drawings, but also encompasses any modifications within the scope of the appended claims.

What we claim is:

1. An internal combustion engine, comprising:
   a structure (20, 17) having an intake channel (21);
   a partition (18) disposed in said intake channel (21) and dividing said intake channel into an air duct (15) and a mixture duct (16), wherein said partition (18) is provided with a connecting opening (31), between said air duct (15) and said mixture duct (16), that at least in a full throttle condition of said internal combustion engine is adapted to be substantially closed;
   a carburetor (20), wherein a section of said intake channel (21) is formed in said carburetor (20), wherein the carburetor is a diaphragm carburetor and comprises a regulating chamber;
   a first fuel opening configured as a main fuel opening (24) disposed in said structure (20, 17) and opening out into said mixture duct (16); and
   at least one second fuel opening, wherein said at least one second fuel opening is an idle fuel opening, wherein the idle fuel opening is connected to the regulating chamber of the carburetor and opens into the mixture duct (16), wherein said at least one idle fuel opening is spaced from a wall (32) of said intake channel (21) by a first distance (a), and wherein said at least one idle fuel opening opens out into said mixture duct (16) at a second distance (c) relative to said partition (18).

2. An internal combustion engine according to claim 1, which includes a fuel tube (27) that extends into said intake channel (21), wherein said at least one second fuel opening is formed on said fuel tube (27).

3. An internal combustion engine according to claim 2, wherein said fuel tube (27) has a length (l) extending into said intake channel (21) that is at least approximately 10%, and in particular approximately 25% to approximately 60%, of a diameter (d) of said intake channel (21).

4. An internal combustion engine according to claim 1, wherein said first distance (a) of said at least one second fuel opening from said wall (32) of said intake channel (21) is at least approximately 5% of a diameter (d) of said intake channel (21).

5. An internal combustion engine according to claim 4, wherein said first distance (a) of said at least one second fuel opening from said wall (32) of said intake channel (21) is greater than approximately 10% of said diameter (d) of said intake channel (21).

6. An internal combustion engine according to claim 1, wherein said at least one second fuel opening is disposed in said intake channel (21) approximately at a level of said connecting opening (31).

7. An internal combustion engine according to claim 1, wherein a throttle element is pivotably mounted in said intake channel (21), and wherein said throttle element is adapted to control a free flow cross-section in said air duct (15) and in said mixture duct (16).

8. An internal combustion engine according to claim 7, wherein at full throttle said connecting opening (31) in said partition (18) is adapted to be closed off by said throttle element.

9. An internal combustion engine according to claim 8, wherein at least one partial throttle fuel opening (25) is disposed in a vicinity of said throttle element.

10. An internal combustion engine according to claim 9, wherein said at least one partial throttle fuel opening (25) is an opening in said wall (32) of said intake channel (21).

11. An internal combustion engine according to claim 7, wherein a choke element is disposed in said intake channel (21) upstream of said throttle element.

12. An internal combustion engine according to claim 11, wherein a partition portion (28) is disposed between said choke element and said throttle element.

13. An internal combustion engine according to claim 12, wherein said partition portion (28) is provided with at least one abutment (41, 42) for at least one of said choke element and said throttle element in their respectively completely opened positions.

14. An internal combustion engine according to claim 7, wherein said structure includes a carburetor (20) and an intermediate flange (17) disposed downstream of said carburetor (20), further wherein said throttle element is disposed in said carburetor (20), and wherein in a completely open position said throttle element rests against said partition in said intermediate flange.

15. An internal combustion engine according to claim 14, wherein said throttle element is a butterfly valve (23) that is pivotably mounted by means of a throttle shaft (30), and wherein said choke element is a choke valve that is pivotably mounted by means of a choke shaft (29).

16. An internal combustion engine according to claim 15, wherein said connecting opening (31) is formed between said throttle shaft (30) and said partition (18) in said intermediate flange (17).

17. An internal combustion engine according to claim 1, wherein said internal combustion engine is a two-cycle engine (1) that operates with scavenging.

18. An internal combustion engine, comprising:
a structure (20, 17) having an intake channel (21);
a partition (18) disposed in said intake channel (21) and dividing said intake channel into an air duct (15) and a mixture duct (16), wherein said partition (18) is provided with a connecting opening (31), between said air duct (15) and said mixture duct (16), that at least in a full throttle condition of said internal combustion engine is adapted to be substantially closed;
a first fuel opening configured as a main fuel opening (24) disposed in said structure (20, 17) and opening out into said mixture duct (16); and
at least one second fuel opening that opens into the mixture duct (16), wherein said at least one second fuel opening is spaced from a plane (33) of said partition (18) by a third distance (b) that is less than approximately 30% of a diameter (d) of said intake channel (21).

19. An internal combustion engine according to claim 1, wherein said third distance (b) of said at least one second fuel opening from said plane (33) of said partition (18) is less than approximately 15% of said diameter (d) of said intake channel (21).

20. An internal combustion engine according to claim 18, wherein said at least one second fuel opening is an idling fuel opening (26).

21. An internal combustion engine, comprising:
a structure (20, 17) having an intake channel (21);
a partition (18) disposed in said intake channel (21) and dividing said intake channel into an air duct (15) and a mixture duct (16), wherein said partition (18) is provided with a connecting opening (31), between said air duct (15) and said mixture duct (16), that at least in a full throttle condition of said internal combustion engine is adapted to be substantially closed;
a first fuel opening configured as a main fuel opening (24) disposed in said structure (20, 17) and opening out into said mixture duct (16); and
at least one second fuel opening that opens into the mixture duct (16), wherein said at least one second fuel opening is spaced from a wall (32) of said intake channel (21) by a first distance (a), and wherein said at least one second fuel opening opens out into said mixture duct (16) at a second distance (c) relative to said partition (18);
a fuel tube (27) that extends into said intake channel (21), wherein said at least one second fuel opening is formed on said fuel tube (27), wherein said fuel tube (27) has a length (l) extending into said intake channel (21) that is at least approximately 10% of said intake channel (21).

* * * * *